(12) United States Patent
Inoh

(10) Patent No.: US 8,203,688 B2
(45) Date of Patent: Jun. 19, 2012

(54) LIQUID CRYSTAL DISPLAY

(75) Inventor: Ippei Inoh, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 210 days.

(21) Appl. No.: 12/666,573

(22) PCT Filed: Feb. 22, 2008

(86) PCT No.: PCT/JP2008/000318
§ 371 (c)(1),
(2), (4) Date: Dec. 23, 2009

(87) PCT Pub. No.: WO2009/004746
PCT Pub. Date: Jan. 8, 2009

(65) Prior Publication Data
US 2010/0171912 A1    Jul. 8, 2010

(30) Foreign Application Priority Data
Jul. 2, 2007   (JP) .................................. 2007-173771

(51) Int. Cl.
G02F 1/137 (2006.01)
(52) U.S. Cl. .......................... 349/176; 349/175; 349/113
(58) Field of Classification Search .................. None
See application file for complete search history.

(56) References Cited

U.S. PATENT DOCUMENTS

| | | | |
|---|---|---|---|
| 5,943,109 A | * | 8/1999 | Kim ............................... 349/113 |
| 6,130,736 A | | 10/2000 | Sasaki et al. |
| 6,141,073 A | | 10/2000 | Sasaki et al. |
| 6,219,120 B1 | | 4/2001 | Sasaki et al. |
| 2002/0176041 A1 | | 11/2002 | Hisamitsu et al. |
| 2003/0043334 A1 | | 3/2003 | Sato et al. |

FOREIGN PATENT DOCUMENTS

| | | |
|---|---|---|
| JP | 11-2807 A | 1/1999 |
| JP | H11-002807 | 1/1999 |
| JP | 2002-287135 A | 10/2002 |
| JP | 2003-5222 A | 1/2003 |
| JP | 2003-140183 | 5/2003 |
| JP | 2003-140183 A | 5/2003 |
| JP | 2004-279965 A | 10/2004 |

OTHER PUBLICATIONS

Eberle, H.-J. et al., "Inverse angle dependence of the reflection colours of cholesteric polymeric liquid crystals mixed with pigments", Liquid Crystals, vol. 5, No. 3, Jan. 1989, pp. 907-916, XP009020190, Basingstoke, Hampshire, GB.

* cited by examiner

Primary Examiner — Thanh-Nhan P. Nguyen
(74) Attorney, Agent, or Firm — Birch, Stewart, Kolasch & Birch, LLP

(57) ABSTRACT

A liquid crystal display includes: a transparent first substrate placed on the display plane side; a transparent second substrate opposed to the first substrate; a cholesteric liquid crystal that is placed between the first and second substrates and whose selective reflection color is yellow; and a reflector for white/blue display opposed to the second substrate. The angular dependence of scattered light intensity of the reflector for white/blue display is equivalent to the angular dependence of scattered light intensity of the cholesteric liquid crystal.

5 Claims, 3 Drawing Sheets

LIQUID CRYSTAL DISPLAY

TECHNICAL FIELD

The present invention relates to a liquid crystal display.

BACKGROUND ART

In recent years, various types of cholesteric liquid crystal displays have been studied which have a cholesteric liquid crystal layer and require neither a backlight nor a polarizing plate. The cholesteric liquid crystal layer includes a plurality of rod-like liquid crystal molecules arranged to form a multilayer structure. The liquid crystal molecules are arranged so that the alignment is in roughly the same direction in the planar direction in which each layer spreads and is helical in the layer stack direction.

Cholesteric liquid crystal in a non-voltage applied state (planar state) selectively reflects light having a specific wavelength (selective reflection wavelength) corresponding to the chiral pitch (helical pitch). Cholesteric liquid crystal in a low-voltage applied state (focal conic state) transmits light. Cholesteric liquid crystal displays display an image by selecting the planar state and the focal conic state appropriately.

As an example of such liquid crystal displays, Patent Document 1 discloses a liquid crystal display element in which a chiral nematic liquid crystal composition that selectively reflects a specific visible light wavelength at room temperature is sandwiched between a pair of substrates at least one of which is transparent. An alignment stabilizing film is formed on each of the substrates, a blue absorption layer is placed on the substrate opposing the display plane, the peak reflection wavelength of the selective reflection of the chiral nematic liquid crystal composition is in the range of 570 to 600 nm, the peak reflection wavelength of the blue absorption layer is in the range of 450 to 480 nm, and the half-width of a spectral reflection waveform observed when the liquid crystal layer made of the above liquid crystal composition is in the selective reflection state is 95 to 115 nm. This disclosure describes that having this configuration, a large-contrast liquid crystal display element exhibiting good whiteness in mono-color display of white color and another color, and in particular a liquid crystal display element that can provide good blue/white display and is small in viewing angular dependence, can be obtained.

CITATION LIST

Patent Document

PATENT DOCUMENT 1: Japanese Patent Publication No. P2003-5222

SUMMARY OF THE INVENTION

Technical Problem

However, in cholesteric liquid crystal, the proportion of specularly reflected components is large and hence the reflected light intensity has angular dependence. Also, the selectively reflected light from cholesteric liquid crystal, which is based on Bragg reflection, has a nature of blue-shifting with light entering obliquely. As for a blue pigment, however, the angular dependence of reflected light intensity is small.

Hence, when the back surface of the layer of yellow cholesteric liquid crystal is coated with a blue pigment, or taped with a blue pigment, to attain white/blue display of the device, the blue color will be intensified when viewed at an oblique angle, reducing the contrast ratio of the display.

Solution to the Problem

An object of the present invention is providing a liquid crystal display capable of securing good visibility of the display screen when viewed at an oblique angle.

The liquid crystal display of the present invention includes: a transparent first substrate placed on the display plane side; a transparent second substrate opposed to the first substrate; a cholesteric liquid crystal that is placed between the first and second substrates and whose selective reflection color is yellow; and a reflector for white/blue display opposed to the second substrate, wherein the angular dependence of scattered light intensity of the reflector for white/blue display is equivalent to the angular dependence of scattered light intensity of the cholesteric liquid crystal.

The "angular dependence of scattered light intensity" described above refers particularly to the ratio of scattered light intensity to specularly reflected light. No scattered light will arise from a perfect mirror. When a predetermined scattering layer is provided, however, light rays other than the specularly reflected light are observed as scattered light.

The expression that "the angular dependence of scattered light intensity of the reflector for white/blue display is equivalent to the angular dependence of scattered light intensity of the cholesteric liquid crystal" means that the ratio of scattered light intensity to specularly reflected light of the former is roughly the same as that of the latter.

Having the configuration described above, in which the angular dependence of scattered light intensity of the reflector for white/blue display is equivalent to the angular dependence of scattered light intensity of the cholesteric liquid crystal material, when the display screen is viewed at an oblique angle, the reflected light intensity of blue color decreases along with blue-shifting of the cholesteric liquid crystal. Therefore, when the display screen is viewed at an oblique angle, the cholesteric liquid crystal in the focal conic state hardly reflects light, and hence the reflectance ratio (contrast ratio) thereof to the blue-shifted blue range of the cholesteric liquid crystal in the planar state is maintained. Good visibility can therefore be attained.

In the liquid crystal display of the present invention, the reflector for white/blue display may include a reflection layer, a scattering layer, and a blue transmission layer formed one upon another in this order, and the blue transmission layer may be opposed to the second substrate.

Alternatively, in the liquid crystal display of the present invention, the reflector for white/blue display may include a reflection layer having a predetermined scattering angle and a blue transmission layer formed one upon the other, and the blue transmission layer may be opposed to the second substrate.

Alternatively, in the liquid crystal display of the present invention, the cholesteric liquid crystal may be aligned in a non-rubbing manner, and the reflector for white/blue display may include a reflection layer and a blue transmission layer formed one upon the other, and the blue transmission layer may be opposed to the second substrate.

The expression that "the cholesteric liquid crystal is aligned in a non-rubbing manner" indicates that no rubbed alignment film is placed in the liquid crystal display and hence the cholesteric liquid crystal is not aligned with the alignment film. In general, in a liquid crystal display, a film for arranging liquid crystal molecules in the liquid crystal display panel in a fixed direction (alignment film) is necessary. To impart an alignment property to the film, the film is subjected to rubbing process in which streaks are formed in one direction with a cloth and the like.

With the configuration described above, the cholesteric liquid crystal, which is aligned in a non-rubbing manner, has a multi-domain structure in the planer state. This permits scattering of light at domain boundaries in the liquid crystal layer. Hence, a simple-structure liquid crystal display device without the necessity of forming a scattering layer can be provided.

In the above configuration, since blue light mirror-reflected inside the liquid crystal display is subjected to Rayleigh scattering in the cholesteric liquid crystal layer in the planar state (short-wavelength light is apt to scatter), "blue color" of the reflected light is combined with "yellow color" of selectively reflected light of the cholesteric liquid crystal layer in the planar state, becoming "white color." When specularly reflected light is incident and passes through a focal conic region, blue reflected light is directly observed, permitting observation of strong blue color. When it passes through a planar region, blue reflected light scatters inside the cholesteric liquid crystal layer as described above. Therefore, the blue light is combined with "yellow color" of the selectively reflected light in the planar region, exhibiting white color. Meanwhile, when scattered light from the surroundings is incident, weak scattered light from the underlying reflection layer is observed in the focal conic region. In the planar region, "yellow color" of selectively reflected light in the planar state is combined with "blue color" of light from the reflection layer scattered inside the planar region, exhibiting white color.

In the liquid crystal display of the present invention, the cholesteric liquid crystal may be aligned in a non-rubbing manner, and the reflector for white/blue display may include a blue hologram.

With the configuration described above, in which the reflector for white/blue display is a blue hologram, the degree of freedom enhances in selection of the reflected light intensity and reflected light wavelength of the device. Also, the designer can design the vision restriction of the device freely.

Advantages of the Invention

According to the present invention, a liquid crystal display capable of securing good visibility of the display screen when viewed at an oblique angle can be provided.

Figure 1:
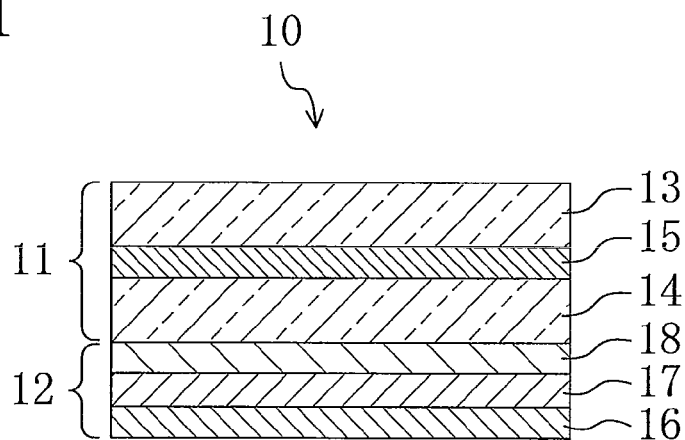
FIG. 1 is a cross-sectional view of a liquid crystal display of Embodiment 1 of the present invention.

DESCRIPTION OF REFERENCE CHARACTERS 10, 20, 30, 40 Liquid crystal display
11, 31, 41 Liquid crystal display panel
12, 22, 32, 42 Reflector for white/blue display
13, 33, 43 First substrate
14, 34, 44 Second substrate
15, 35, 45 Cholesteric liquid crystal layer
16, 26, 36 Reflection layer
17 Scattering layer
18, 28, 38 Blue transmission layer
21 Diffusion mirror surface

DESCRIPTION OF EMBODIMENTS

Embodiments of the present invention will be described hereinafter in detail with reference to the accompanying drawings. Note however that the present invention is not limited to these embodiments.

Embodiment 1

A liquid crystal display 10 of Embodiment 1 of the present invention will be described in detail with reference to the drawings.

(Configuration of Liquid Crystal Display 10)

FIG. 1 is a cross-sectional view of the liquid crystal display 10 of this embodiment. The liquid crystal display 10 includes a liquid crystal display panel 11 and a reflector 12 for white/blue display.

The liquid crystal display panel 11 includes a first substrate 13, a second substrate 14 opposed to the first substrate 13, and a cholesteric liquid crystal layer 15 that is placed between the first and second substrates 13 and 14 and includes cholesteric liquid crystal molecules whose selective reflection color is yellow.

Each of the first substrate 13 and the second substrate 14 includes a transparent substrate made of glass or a resin such as polycarbonate, polyethylene terephthalate, and polyether sulfone, a transparent electrode patterned on the transparent substrate, an alignment film applied to the surface of the transparent electrode and subjected to alignment treatment such as rubbing, and the like.

As the transparent electrode, a transparent conductive film such as a tin oxide film, a zinc oxide film, an indium tin oxide (ITO) film as a compound of indium oxide and tin oxide, and an indium zinc oxide (IZO) film as a compound of indium oxide and zinc oxide may be used.

As the alignment film of the liquid crystal display panel 11, a resin such as polyimide, an inorganic evaporated film such as a silicon oxide film, and silane-based, ammonia-based, and other surface modifiers may be placed.

The cholesteric liquid crystal layer 15 includes a plurality of rod-like cholesteric liquid crystal molecules constituting a multilayer structure. When no voltage is applied across the cholesteric liquid crystal layer 15, the cholesteric liquid crystal molecules are arranged in roughly the same direction in the layer direction and arranged helically in the layer stack direction (planar state). The cholesteric liquid crystal layer 15 in the planar state selectively reflects light having a wavelength near a selective reflection wavelength corresponding to the chiral pitch (helical pitch) of the cholesteric liquid crystal molecules arranged helically in the layer stack direction, while transmitting light having a wavelength that is not near the selective reflection wavelength. The "selective reflection wavelength" as used herein refers to a wavelength obtained by multiplying the average refractive index of the cholesteric liquid crystal molecules by the chiral pitch (helical pitch) of the cholesteric liquid crystal molecules, and is synonymous with the "peak wavelength of selective reflection."

The cholesteric liquid crystal layer 15 in the low-voltage applied state (focal conic state) transmits incident light in the entire wavelength band without selectively reflecting light having a wavelength near the selective reflection wavelength. Once the cholesteric liquid crystal layer 15 becomes the focal conic state with application of a low voltage, it maintains the focal conic state even after the voltage application is stopped. Accordingly, in the liquid crystal display 10 having the cholesteric liquid crystal layer 15, power consumption per unit time can be reduced particularly in display of a still image. As the cholesteric liquid crystal molecules, the following can be used, for example: a nematic liquid crystal composition having a mesogen such as cyanobiphenyl, phenylcyclohexyl, phenylbenzoate, cyclohexylbenzoate, azomethine, azobenzene, pyrimidine, dioxane, cyclohexylcyclohexane, and tolane with a chiral agent made of a compound having an optically active group such as a cholesterol derivative and a 2-methylbutyl group added thereto.

The reflector 12 for white/blue display includes a reflection layer 16, a scattering layer 17, and a blue transmission layer 18 formed one upon another in this order, in which the blue transmission layer 18 is opposed to the second substrate 14.

As the reflection layer 16, a plastic film such as a polyethylene terephthalate (PET) film with a metal such as silver and aluminum evaporated thereon, or a smooth, thin metal film obtained by drawing a metal, such as aluminum foil, for example, is used, forming a mirror surface. If the metal (evaporated) surface as the mirror surface is susceptible to deterioration from oxygen, water, and the like, a protection layer may be formed on the metal (evaporated) surface for anti-deterioration. Such anti-deterioration measures should be taken appropriately depending on the type of the metal and the desired durability.

As the scattering layer 17, an acrylic diffusion material with microparticles mixed therein in a concentration of about 5 wt %, for example, is formed on the surface of the reflection layer 16 to a thickness of about 1 μm.

The microparticles in the scattering layer 17 are preferably spherical, in particular pearl-shaped. As such microparticles, used are microparticles of an organic macromolecular compound such as acrylic resin, polyurethane resin, and polystyrene resin, microparticles of silicon-containing resin, and microparticles of an inorganic compound such as silica.

The scattering property of the scattering layer 17 can be changed by changing the particle density and particle size of the microparticles, the thickness of the scattering layer 17, the refractive index of the resin, and the like.

As the blue transmission layer 18, an acrylic resin with a blue pigment such as copper phtalocyanine (CuPc), for example, mixed therein is formed on the acrylic diffusion material.

The angular dependence of scattered light intensity of the reflector 12 for white/blue display configured as described above is made equivalent to the angular dependence of scattered light intensity of the cholesteric liquid crystal layer 15. To state specifically, as shown in FIG. 5, the reflector 12 for white/blue display and the cholesteric liquid crystal layer 15 exhibit roughly the same relationship between the angle from the zenith and the reflectance.

Figure 5:
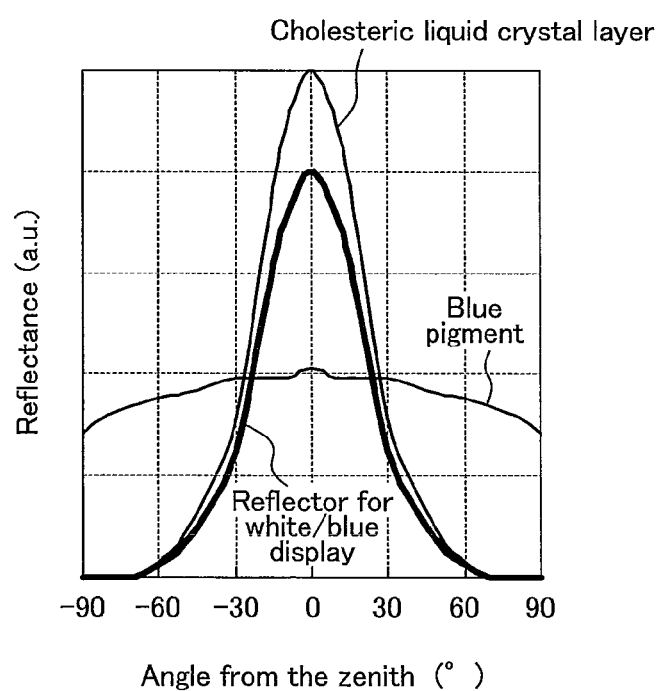
FIG. 5 is a graph showing the relationship between the angle from the zenith and the reflectance for a reflector for white/blue display and a cholesteric liquid crystal layer in Embodiments 1 to 4 of the present invention.
Figure 6:
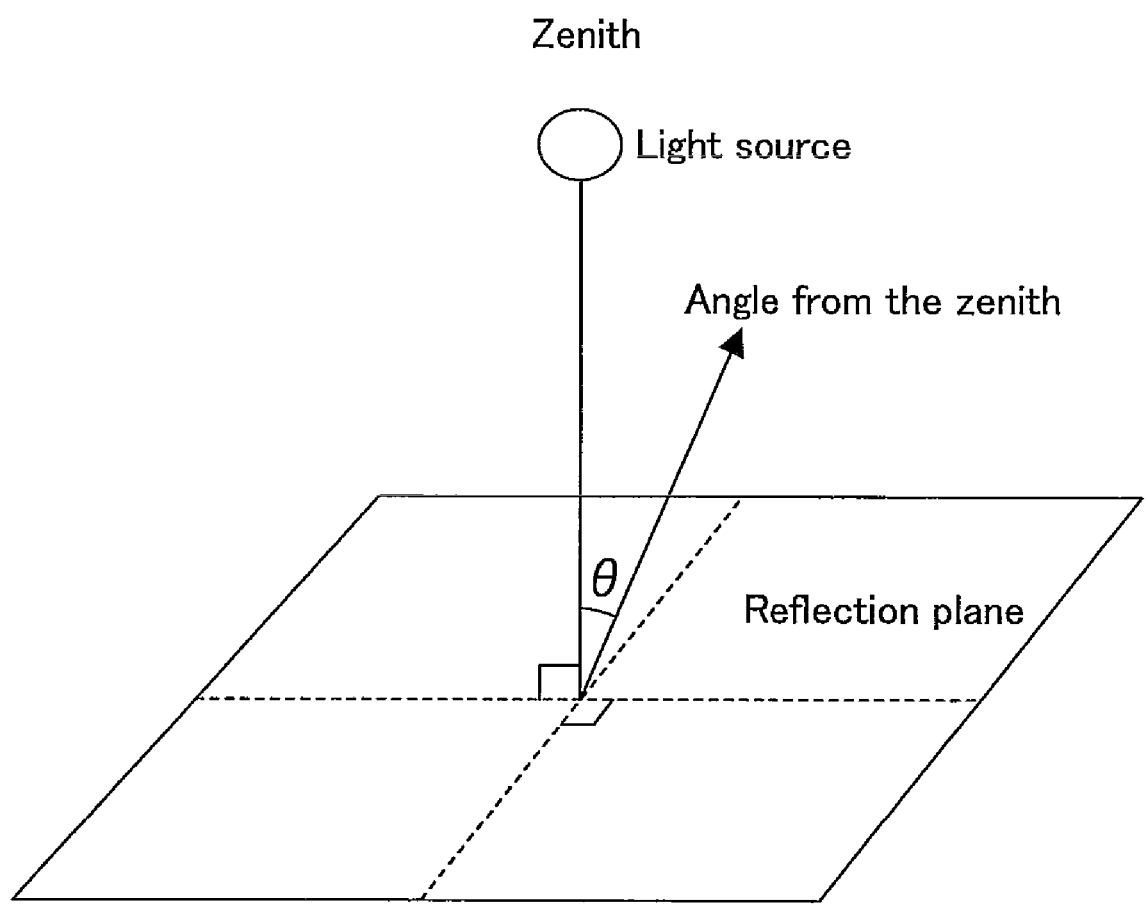
FIG. 6 is a schematic view of an optical system for measurement of the angle and the reflectance shown in FIG. 5.

In the graph shown in FIG. 5, the "angle from the zenith" refers to the angle θ from the line drawn from the light source placed at the zenith with respect to the reflection plane to the reflection plane (the normal to the reflection place) as shown in FIG. 6, which is a schematic view of an optical system for measurement of the angle and the reflectance shown in FIG. 5.

In FIG. 5, while the angular dependence of reflected light intensity of the blue pigment constituting the blue transmission layer 18 is small, the angular dependence of reflected light intensity of the reflector 12 for while/blue display is large, and the ratio of the scattered light intensity to the specularly reflected light of the reflector 12 for white/blue display is equivalent to that of the cholesteric liquid crystal layer 15.

(Method for Fabricating Liquid Crystal Display 10)

Next, a method for fabricating the liquid crystal display 10 of Embodiment 1 of the present invention will be described.

(Formation of Liquid Crystal Display Panel 11)

First, a glass substrate having a size of 365 mm×460 mm and a thickness of 0.7 mm, for example, is prepared.

A transparent electrode made of ITO, for example, is patterned on the glass substrate, and then an alignment film is applied to the resultant substrate.

The surface of the alignment film is then subjected to alignment treatment such as rubbing, to form the first substrate 13. Note that a thin inorganic film made of silicon oxide may be formed as an insulating film between the alignment film and the ITO.

The second substrate 14 is also formed in a manner similar to that described above, and then the first substrate 13 and the second substrate 14 are bonded together with spacers made of plastic beads having a particle size of about 5 μm, for example, therebetween.

The bonding between the first substrate 13 and the second substrate 14 is made by sealing the peripheries of the bonding surfaces of the two substrates with epoxy resin and the like.

Yellow cholesteric liquid crystal molecules having a selective wavelength of about 560 nm, for example, are then injected in the space between the two substrates, thereby obtaining the liquid crystal display panel 11.

(Formation of Reflector 12 for White/Blue Display)

A PET film is prepared, and aluminum is evaporated on the surface of the PET film to about 100 nm, for example, to form the reflection layer 16.

An acrylic diffusion material with microparticles mixed therein in a concentration of about 5 wt %, for example, is applied to the aluminum surface of the PET film to a thickness of about 1 μm and cured, to form the scattering layer 17.

An acrylic resin with about 3 wt % of copper phtalocyanine mixed therein is applied to the acrylic diffusion material to a thickness of about 2 μm and cured, to form the blue transmission layer 18, thereby obtaining the reflector 12 for white/blue display.

Thereafter, the reflector 12 for white/blue display is bonded to the second substrate 14 of the liquid crystal display panel 11 fabricated as described above with a transparent adhesive material.

The liquid crystal display 10 is thus completed.

—Operational Advantages of Liquid Crystal Display 10—

According to the liquid crystal display 10 fabricated as described above, when light incident from the front is specularly reflected, light specularly reflected by the cholesteric liquid crystal layer 15 and blue light reflected by the back are combined, thereby displaying good white color. Also, in focal conic regions of the cholesteric liquid crystal layer 15, the color of the blue diffusion layer is clearly visible. Hence, good white/blue color is displayed.

As the device is tilted from the front so that the specularly reflected light becomes invisible, the liquid crystal reflection color is blue-shifted, reducing the reflectance. At this time, however, since the reflected light intensity of the reflector 12 for white/blue display also decreases, the contrast can be kept unchanged although the display changes from white/blue to light blue/dark blue.

Embodiment 2

A liquid crystal display 20 of Embodiment 2 of the present invention will be described in detail with reference to the drawings.

(Configuration of Liquid Crystal Display 20)

Figure 2:
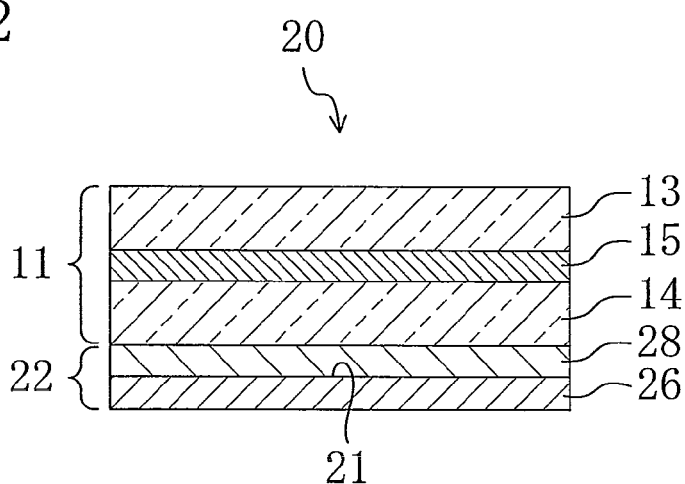
FIG. 2 is a cross-sectional view of a liquid crystal display of Embodiment 2 of the present invention.

FIG. 2 is a cross-sectional view of the liquid crystal display 20 of Embodiment 2 of the present invention. Note that like components as those of the liquid crystal display 10 of Embodiment 1 described above are denoted by the same reference numerals, and description thereof is omitted in this embodiment.

The liquid crystal display 20 includes the liquid crystal display panel 11 and a reflector 22 for white/blue display.

The liquid crystal display panel 11 includes the first substrate 13 placed on the display plane side, the second substrate 14 opposed to the first substrate 13, and the cholesteric liquid crystal layer 15 that is placed between the first and second substrates 13 and 14 and includes cholesteric liquid crystal molecules whose selective reflection color is yellow.

The reflector 22 for white/blue display includes a reflection layer 26 having a predetermined scattering angle and a blue transmission layer 28 formed one upon the other, in which the blue transmission layer 28 is opposed to the second substrate 14.

As the reflection layer 26, used is a plastic film such as a PET film with a metal such as silver and aluminum evaporated thereon, the surface of which is embossed to have a predetermined scattering angle. The resultant reflection layer 26 therefore has a diffusion minor surface 21.

If the metal (evaporated) surface as the minor surface is susceptible to deterioration from oxygen, water, and the like, a protection layer may be formed on the metal (evaporated) surface for anti-deterioration. Such anti-deterioration measures should be taken appropriately depending on the type of the metal and the desired durability.

As the blue transmission layer 28, an acrylic resin with a blue pigment such as copper phtalocyanine (CuPc), for example, mixed therein is formed on the acrylic diffusion material.

The angular dependence of scattered light intensity of the reflector 22 for white/blue display configured as described above is made equivalent to the angular dependence of scattered light intensity of the cholesteric liquid crystal layer 15, as discussed above with reference to FIG. 5, for example.

(Method for Fabricating Liquid Crystal Display 20)

Next, a method for fabricating the liquid crystal display 20 of Embodiment 2 of the present invention will be described.

(Formation of Liquid Crystal Display Panel 11)

The liquid crystal display panel 11 is fabricated in a manner similar to that described above in Embodiment 1.

(Formation of Reflector 22 for White/Blue Display)

A PET film is prepared, and then the surface thereof is embossed to have a predetermined scattering angle.

Aluminum is then evaporated on the embossed PET film surface to a thickness of about 100 nm, for example, to form the reflection layer 26 having the diffusion minor surface 21.

An acrylic resin with about 3 wt % of copper phtalocyanine mixed therein is applied to the aluminum surface of the reflection layer 26 to a thickness of about 2 μm and cured to form the blue transmission layer 28, thereby obtaining the reflector 22 for white/blue display.

The resultant reflector 22 for white/blue display is bonded to the second substrate 14 of the liquid crystal display panel 11 fabricated as described above with a transparent adhesive material.

The liquid crystal display 20 is thus completed.

—Operational Advantages of Liquid Crystal Display 20—

According to the liquid crystal display 20 fabricated as described above, like the liquid crystal display 10 of Embodiment 1, when light incident from the front is specularly reflected, light specularly reflected by the cholesteric liquid crystal layer 15 and blue light reflected by the back are combined, thereby displaying good white color. Also, in focal conic regions of the cholesteric liquid crystal layer 15, the color of the blue diffusion layer is clearly visible. Hence, good white/blue color is displayed. Even when viewed at an oblique angle, the display screen can be viewed with a good viewing quality.

Embodiment 3

A liquid crystal display 30 of Embodiment 3 of the present invention will be described in detail with reference to the drawings.

(Configuration of Liquid Crystal Display 30)

Figure 3:
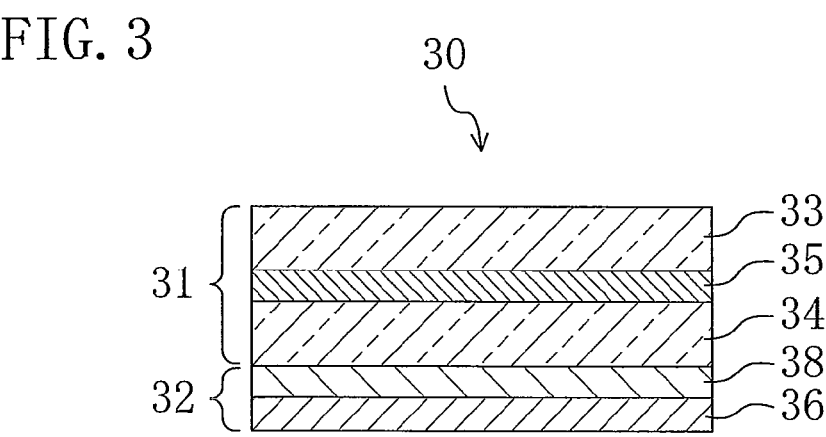
FIG. 3 is a cross-sectional view of a liquid crystal display of Embodiment 3 of the present invention.

FIG. 3 is a cross-sectional view of the liquid crystal display 30 of Embodiment 3 of the present invention.

The liquid crystal display 30 includes a liquid crystal display panel 31 and a reflector 32 for white/blue display.

The liquid crystal display panel 31 includes a first substrate 33 placed on the display plane side, a second substrate 34 opposed to the first substrate 33, and a cholesteric liquid crystal layer 35 that is placed between the first and second substrates 33 and 34 and includes cholesteric liquid crystal molecules whose selective reflection color is yellow.

The configuration of the liquid crystal display panel 31 is the same as that of the liquid crystal display panel 11 in Embodiment 1 described above except that the alignment film is not rubbed. That is, the cholesteric liquid crystal molecules of the liquid crystal display panel 31 are aligned in a non-rubbing manner.

The reflector 32 for white/blue display includes a reflection layer 36 and a blue transmission layer 38, in which the blue transmission layer 38 is opposed to the second substrate 34.

As the reflection layer 36, a plastic film such as a polyethylene terephthalate (PET) film with a metal such as silver and aluminum evaporated thereon, or a smooth, thin metal film obtained by drawing a metal, such as aluminum foil, for example, is used, forming a minor surface. If the metal (evaporated) surface as the mirror surface is susceptible to deterioration from oxygen, water, and the like, a protection layer may be formed on the metal (evaporated) surface for anti-deterioration. Such anti-deterioration measures should be taken appropriately depending on the type of the metal and the desired durability.

As the blue transmission layer 38, an acrylic resin with a blue pigment such as copper phtalocyanine (CuPc), for example, mixed therein is formed on the acrylic diffusion material.

The angular dependence of scattered light intensity of the reflector 32 for white/blue display configured as described above is made equivalent to the angular dependence of scattered light intensity of the cholesteric liquid crystal layer 35.

(Method for Fabricating Liquid Crystal Display 30)

Next, a method for fabricating the liquid crystal display 30 of Embodiment 3 of the present invention will be described.

(Formation of Liquid Crystal Display Panel 31)

The liquid crystal display panel 31 is fabricated in a manner similar to that described above in Embodiment 1. Note however that in Embodiment 3, the alignment film is not rubbed.

(Formation of Reflector 32 for White/Blue Display)

A PET film is prepared, and aluminum is evaporated on the surface of the PET film to about 100 nm, for example, to form the reflection layer 36.

An acrylic resin with about 3 wt % of copper phtalocyanine mixed therein is applied to the aluminum surface of the reflection layer 36 to a thickness of about 2 μm and cured to form the blue transmission layer 38, thereby obtaining the reflector 32 for white/blue display.

The resultant reflector 32 for white/blue display is bonded to the second substrate 34 of the liquid crystal display panel 31 fabricated as described above with a transparent adhesive material.

The liquid crystal display 30 is thus completed.

—Operational Advantages of Liquid Crystal Display 30—

According to the liquid crystal display 30 fabricated as described above, like the liquid crystal display 10 of Embodiment 1, when light incident from the front is specularly reflected, light specularly reflected by the cholesteric liquid crystal layer 35 and blue light reflected by the back are combined, thereby displaying good white color. Also, in focal conic regions of the cholesteric liquid crystal layer 35, the color of the blue diffusion layer is clearly visible. Hence, good white/blue color is displayed. Even when viewed at an oblique angle, the display screen can be viewed with a good viewing quality.

Embodiment 4

A liquid crystal display 40 of Embodiment 4 of the present invention will be described in detail with reference to the drawings.

(Configuration of Liquid Crystal Display 40)

Figure 4:
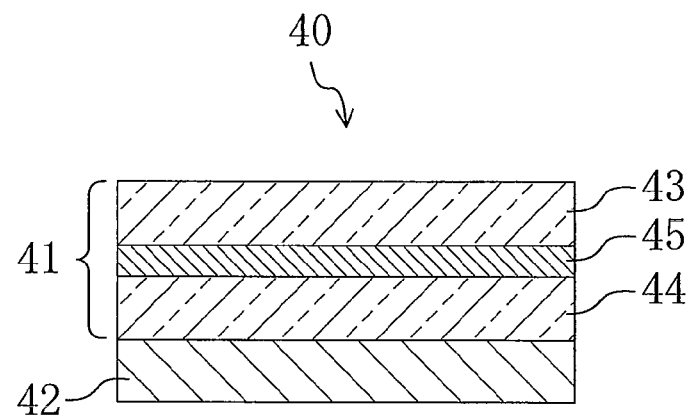
FIG. 4 is a cross-sectional view of a liquid crystal display of Embodiment 4 of the present invention.

FIG. 4 is a cross-sectional view of the liquid crystal display 40 of Embodiment 4 of the present invention.

The liquid crystal display 40 includes a liquid crystal display panel 41 and a reflector 42 for white/blue display.

The liquid crystal display panel 41 includes a first substrate 43 placed on the display plane side, a second substrate 44 opposed to the first substrate 43, and a cholesteric liquid crystal layer 45 that is placed between the first and second substrates 43 and 44 and includes cholesteric liquid crystal molecules whose selective reflection color is yellow.

The configuration of the liquid crystal display panel 41 is the same as that of the liquid crystal display panel 11 in Embodiment 1 described above except that the alignment film is not rubbed. That is, the cholesteric liquid crystal molecules of the liquid crystal display panel 41 are aligned in a non-rubbing manner.

The reflector 42 for white/blue display includes a blue hologram, which is opposed to the second substrate 44.

The blue hologram (reflector 42 for white/blue display) includes a light curing resin layer made of a plastic film such as a PET film having a predetermined pattern of irregularities formed thereon, a metal film made of silver and aluminum evaporated on the light curing resin layer, an acrylic resin with a blue pigment such as copper phtalocyanine (CuPc), for example, mixed therein formed on the metal film, and the like.

The angular dependence of scattered light intensity of the reflector 42 for white/blue display configured as described above is made equivalent to the angular dependence of scattered light intensity of the cholesteric liquid crystal layer 45, as discussed above with reference to FIG. 5, for example.

(Method for Fabricating Liquid Crystal Display 40)

Next, a method for fabricating the liquid crystal display 40 of Embodiment 4 of the present invention will be described.

(Formation of Liquid Crystal Display Panel 41)

The liquid crystal display panel 41 is fabricated in a manner similar to that described above in Embodiment 1. Note however that in Embodiment 4, the alignment film is not rubbed.

(Formation of Reflector 42 for White/Blue Display)

A resin composition including a light curing resin is applied to a PET film and dried to form the light curing resin layer. A stamper having a pattern of fine irregularities is placed on the resin layer and pressed, to transfer the pattern of irregularities to the resin layer.

The resin layer having the irregularities formed thereon is then irradiated with an active energy ray such as ultraviolet light, to fix the pattern of fine irregularities to the resin layer. Aluminum is then evaporated on the patterned surface of the resin layer to about 100 nm, for example.

An acrylic resin with about 3 wt % of copper phtalocyanine mixed therein is then applied to the aluminum surface to a thickness of about 2 μm and cured, thereby obtaining the blue hologram (reflector 42 for white/blue display).

The resultant reflector 42 for white/blue display is bonded to the second substrate 44 of the liquid crystal display panel 41 fabricated as described above with a transparent adhesive material.

The liquid crystal display 40 is thus completed.

—Operational Advantages of Liquid Crystal Display 40—

According to the liquid crystal display 40 fabricated as described above, like the liquid crystal display 10 of Embodiment 1, when light incident from the front is specularly reflected, light specularly reflected by the cholesteric liquid crystal layer 45 and blue light reflected by the back are combined, thereby displaying good white color. Also, in focal conic regions of the cholesteric liquid crystal layer 45, the color of the blue diffusion layer is clearly visible. Hence, good white/blue color is displayed. Even when viewed at an oblique angle, the display screen can be viewed with a good viewing quality.

INDUSTRIAL APPLICABILITY

As described above, the present invention is applicable to liquid crystal displays.

The invention claimed is:

1. A liquid crystal display, comprising:
   a transparent first substrate placed on the display plane side;
   a transparent second substrate opposed to the first substrate;
   a cholesteric liquid crystal that is placed between the first and second substrates and whose selective reflection color is yellow; and
   a reflector for white/blue display opposed to the second substrate, wherein
   the angular dependence of scattered light intensity of the reflector for white/blue display is equivalent to the angular dependence of scattered light intensity of the cholesteric liquid crystal.

2. The liquid crystal display of claim 1, wherein the reflector for white/blue display includes a reflection layer, a scattering layer, and a blue transmission layer formed one upon another in this order, and the blue transmission layer is opposed to the second substrate.

3. The liquid crystal display of claim 1, wherein the reflector for white/blue display includes a reflection layer having a predetermined scattering angle and a blue transmission layer formed one upon the other, and the blue transmission layer is opposed to the second substrate.

4. The liquid crystal display of claim 1, wherein the cholesteric liquid crystal is aligned in a non-rubbing manner, and the reflector for white/blue display includes a reflection layer and a blue transmission layer formed one upon the other, and the blue transmission layer is opposed to the second substrate.

5. The liquid crystal display of claim 1, wherein the cholesteric liquid crystal is aligned in a non-rubbing manner, and the reflector for white/blue display includes a blue hologram.

* * * * *